United States Patent
Feng

(10) Patent No.: US 12,449,918 B2
(45) Date of Patent: Oct. 21, 2025

(54) PANEL INTERACTION METHOD, APPARATUS, DEVICE AND STORAGE MEDIUM

(71) Applicant: Beijing Zitiao Network Technology Co., Ltd., Beijing (CN)

(72) Inventor: Xue Feng, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/388,787

(22) Filed: Nov. 10, 2023

(65) Prior Publication Data
US 2024/0160304 A1    May 16, 2024

(30) Foreign Application Priority Data
Nov. 14, 2022    (CN) .......................... 202211425539.2

(51) Int. Cl.
*G06F 3/038*    (2013.01)
*G06F 3/01*    (2006.01)
*G06F 3/0346*    (2013.01)

(52) U.S. Cl.
CPC .......... *G06F 3/0383* (2013.01); *G06F 3/0346* (2013.01); *G06F 3/017* (2013.01)

(58) Field of Classification Search
CPC ...... G06F 3/0383; G06F 3/0346; G06F 3/017; G06F 3/011
See application file for complete search history.

(56) References Cited

U.S. PATENT DOCUMENTS

| | | | |
|---|---|---|---|
| 6,771,294 B1 * | 8/2004 | Pulli | G06F 3/011 715/764 |
| 8,467,133 B2 * | 6/2013 | Miller | G02B 27/017 359/13 |
| 9,754,167 B1 * | 9/2017 | Holz | G06F 3/011 |
| 9,857,170 B2 * | 1/2018 | Abovitz | H04B 10/25891 |
| 9,910,506 B2 * | 3/2018 | Spiessl | G02B 27/0172 |
| 10,181,219 B1 * | 1/2019 | Murphy | A63F 13/26 |
| 10,345,925 B2 * | 7/2019 | Du Bois | G06F 3/0346 |
| 10,429,923 B1 * | 10/2019 | Johnston | G06F 3/011 |
| 10,521,020 B2 * | 12/2019 | West | G06F 3/0346 |
| 10,551,993 B1 * | 2/2020 | Sanocki | G06F 3/017 |
| 11,145,126 B1 * | 10/2021 | Bramwell | G06F 3/147 |

(Continued)

FOREIGN PATENT DOCUMENTS

CN    114445604 A    5/2022

*Primary Examiner* — Benyam Ketema
(74) *Attorney, Agent, or Firm* — BakerHostetler

(57) ABSTRACT

This application provides a panel interaction method, apparatus, device, and a storage medium. The method includes: determining, in response to an adsorption instruction of a first manipulation body in a manipulation body pair in a virtual space towards a space panel, an associated position of the first manipulation body; and adsorbing the space panel to the associated position of the first manipulation body. According to the embodiments of this application, the space panel is adsorbed to the associated position of the first manipulation body, so that adsorption of any manipulation body in the virtual space to the space panel is realized, and the problem of blocking the user's line of sight when presenting the space panel in front of the user is prevented, and the diversified presentation of the space panel in the virtual space is ensured.

19 Claims, 8 Drawing Sheets

Determining, in response to an adsorption instruction of a first manipulation body in a manipulation body pair in a virtual space towards a space panel, an associated position of the first manipulation body — S110

Adsorbing the space panel to the associated position of the first manipulation body — S120

(56) References Cited

U.S. PATENT DOCUMENTS

| | | | |
|---|---|---|---|
| 11,500,476 B1* | 11/2022 | Chen | G08B 21/02 |
| 11,538,443 B2* | 12/2022 | Woo | G06F 3/011 |
| 11,556,879 B1* | 1/2023 | Timmons | G06Q 10/06398 |
| 11,836,205 B2* | 12/2023 | Inch | G06F 3/011 |
| 12,019,944 B2* | 6/2024 | Liu | G06F 3/011 |
| 12,086,407 B2* | 9/2024 | Klein | G06F 3/012 |
| 2002/0060648 A1* | 5/2002 | Matsui | G06F 3/011 345/8 |
| 2010/0199232 A1* | 8/2010 | Mistry | G06F 3/0426 715/863 |
| 2011/0205242 A1* | 8/2011 | Friesen | A43B 3/0078 345/633 |
| 2012/0122062 A1* | 5/2012 | Yang | G09B 9/00 434/219 |
| 2012/0302289 A1* | 11/2012 | Kang | G06F 3/016 455/557 |
| 2014/0078176 A1* | 3/2014 | Kim | G06F 3/011 345/633 |
| 2015/0016777 A1* | 1/2015 | Abovitz | G02B 27/0093 385/37 |
| 2018/0012074 A1* | 1/2018 | Holz | G06F 3/011 |
| 2018/0157398 A1* | 6/2018 | Kaehler | G06V 10/464 |
| 2018/0285636 A1* | 10/2018 | Fei | G02B 27/017 |
| 2018/0321737 A1* | 11/2018 | Pahud | G06F 3/0304 |
| 2018/0341386 A1* | 11/2018 | Inomata | A63F 13/211 |
| 2019/0094981 A1* | 3/2019 | Bradski | G06V 40/168 |
| 2019/0362562 A1* | 11/2019 | Benson | G06V 10/82 |
| 2019/0392728 A1* | 12/2019 | Pike | G09B 19/003 |
| 2020/0097065 A1* | 3/2020 | Iyer | G06F 3/017 |
| 2020/0265633 A1* | 8/2020 | Okutani | G06F 3/012 |
| 2020/0320793 A1* | 10/2020 | Marcolina | G06F 3/012 |
| 2020/0326847 A1* | 10/2020 | Wang | G06F 3/0304 |
| 2021/0004076 A1* | 1/2021 | Schweet | G06N 5/04 |
| 2021/0287382 A1* | 9/2021 | Lehrich | G06F 3/0346 |
| 2022/0172444 A1* | 6/2022 | Lebeau | G06T 19/003 |
| 2022/0308746 A1* | 9/2022 | Igarashi | G06F 3/04817 |
| 2023/0092103 A1* | 3/2023 | Puyol | G06F 3/011 715/205 |
| 2023/0138952 A1* | 5/2023 | Klein | G06T 7/70 345/633 |
| 2023/0185513 A1* | 6/2023 | Liu | G06F 3/0346 345/520 |
| 2023/0214009 A1* | 7/2023 | Ahsan | G06F 3/0346 345/156 |
| 2023/0289049 A1* | 9/2023 | Zhang | G06F 3/017 |
| 2024/0111473 A1* | 4/2024 | Wang | G06F 3/1423 |
| 2024/0211090 A1* | 6/2024 | Dasher | G06F 3/0346 |
| 2024/0219997 A1* | 7/2024 | Xu | G06F 3/0237 |
| 2024/0248528 A1* | 7/2024 | Wallen | G06F 3/011 |
| 2024/0329754 A1* | 10/2024 | Bora | G06F 3/04886 |

* cited by examiner

PANEL INTERACTION METHOD, APPARATUS, DEVICE AND STORAGE MEDIUM

CROSS-REFERENCE TO RELATED APPLICATION

The present application claims the priority of Chinese patent application No. 202211425539.2 filed on Nov. 14, 2022, and the entire content disclosed by the Chinese patent application is incorporated herein by reference as part of the present application.

TECHNICAL FIELD

Embodiments of this application relate to the technical field of Extended Reality (XR), in particular to a panel interaction method, apparatus, device and a storage medium.

BACKGROUND

At present, the application scenes of XR technology are more and more extensive, including Virtual Reality (VR), Augmented Reality (AR) and Mixed Reality (MR), etc. In various virtual reality scenes, users can perform corresponding interactive operations on the corresponding space panels to experience the real virtual interactive scenes in an immersive way.

Usually, the space panel in the virtual space will appear in front of the user's line of sight, thus blocking the user's viewing line of sight when interacting with other virtual objects in the virtual space, and greatly reducing the user's interactive experience in the virtual space.

SUMMARY

The embodiments of this application provide a panel interaction method, apparatus, device and a storage medium, which can realize the adsorption of any manipulation body in the virtual space to the space panel, avoid blocking the user's line of sight in the virtual space and ensure the diversified presentation of the space panel in the virtual space.

In a first aspect, the embodiment of the present disclosure provides a panel interaction method, which is applied to an extended reality (XR) device, and the method comprises: determining, in response to an adsorption instruction of a first manipulation body in a manipulation body pair in a virtual space towards a space panel, an associated position of the first manipulation body; and adsorbing the space panel to the associated position of the first manipulation body.

In a second aspect, the embodiment of the present disclosure provides a panel interaction apparatus, the apparatus is configured on an extended reality (XR) device, and the apparatus comprises: an associated position determining module, configured to determine, in response to an adsorption instruction of a first manipulation body in a manipulation body pair in a virtual space towards a space panel, an associated position of the first manipulation body; and a panel adsorption module, configured to adsorb the space panel to the associated position of the first manipulation body.

In a third aspect, the embodiment of the present disclosure provides an electronic device, which comprises: a processor; and a memory, configured to store executable instructions of the processor; the processor is configured, by executing the executable instructions, to execute the panel interaction method provided by the first aspect of the embodiment of the present disclosure.

In a fourth aspect, the embodiment of the present disclosure provides a computer-readable storage medium, on which a computer program is stored, wherein when the computer program is executed by a processor, the panel interaction method provided by the first aspect of the embodiment of the present disclosure is realized.

In a fifth aspect, the embodiment of the present disclosure provides a computer program product, which comprises computer program/instructions, when the computer program/instructions are run on an electronic device, the electronic device is caused to execute the panel interaction method provided by the first aspect of the embodiment of the present disclosure.

According to technical solutions of this application, any manipulation body in the manipulation body pair in the virtual space is taken as the first manipulation body, and the other manipulation body is taken as the second manipulation body. Then, the first manipulation body initiates a corresponding adsorption instruction towards the space panel to adsorb the space panel to the associated position of the first manipulation body, so as to realize the adsorption of any manipulation body in the virtual space to the space panel, avoid blocking the user's line of sight in the virtual space, prevent the problem of blocking the user's line of sight when presenting the space panel in front of the user, and ensure the diversified presentation of the space panel in the virtual space.

BRIEF DESCRIPTION OF DRAWINGS

In order to more clearly illustrate the technical solutions in the embodiments of this application, the drawings that need to be used in the description of the embodiments will be briefly introduced below. Obviously, the drawings in the following description are only some embodiments of this application. For those skilled in the art, other drawings can also be obtained based on these drawings without inventive work.

DETAILED DESCRIPTION

In the following, the technical solutions in the embodiments of this application will be clearly and completely described with reference to the drawings in the embodiments of this application. Apparently, the described embodiments are just a part but not all of the embodiments of the present disclosure. Based on the embodiments of this application, those skilled in the art can obtain other embodiment(s), without any inventive work, which should be within the protection scope of the present disclosure.

It should be noted that the terms "first," "second," etc., in the description, claims and the foregoing drawings of this application are intended to distinguish similar objects, and are not necessarily used to describe a specific order or sequence. It should be understood that the data so used can be interchanged under appropriate circumstances, so that the embodiments of this application described herein can be implemented in other orders than those illustrated or described herein. Furthermore, the terms "including" and "having" and any variants thereof are intended to cover non-exclusive inclusion; for example, a process, method, system, product or device that includes a series of steps or units is not necessarily limited to those explicitly listed, but may include other steps or units not explicitly listed or inherent to the process, method, product or device.

In the embodiments of this application, words, such as "example" or "for example", etc., are used to indicate examples, instances, or description. Any embodiment or solution described as "example" or "for example" in the embodiments of this application is not to be construed as being more preferred or having more advantages than another embodiment or solution. Exactly, use of the words, such as "example" or "for example", etc., is intended to present a relative concept in a specific manner.

In order to avoid the problem of blocking the user's line of sight when presenting the space panel in front of the user's line of sight, the inventive concept of this application is that any manipulation body in the manipulation body pair in the virtual space is taken as the first manipulation body, and the other manipulation body is taken as the second manipulation body. Then, the first manipulation body initiates a corresponding adsorption instruction towards the space panel to adsorb the space panel to the associated position of the first manipulation body, so as to realize the adsorption of any manipulation body in the virtual space to the space panel, avoid blocking the user's line of sight in the virtual space, prevent the problem of blocking the user's line of sight when presenting the space panel in front of the user, and ensure the diversified presentation of the space panel in the virtual space.

Figure 1:
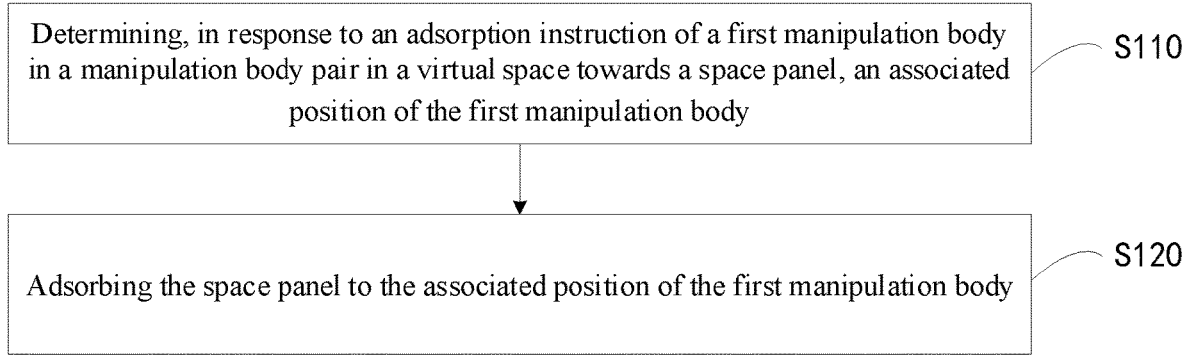
FIG. 1 is a flowchart of a panel interaction method provided by an embodiment of this application.

FIG. 1 is a flowchart of a panel interaction method provided by an embodiment of this application, which can be applied to an XR device, but is not limited thereto. The method can be executed by the panel interaction apparatus provided by this application. The panel interaction apparatus can be implemented by any software and/or hardware. Exemplarily, the panel interaction apparatus can be configured in electronic devices capable of simulating virtual scenes, such as AR/VR/MR, etc., and this application does not impose any limitation on the specific types of electronic devices.

Specifically, as shown in FIG. 1, the method can include the following steps:

S110: Determining, in response to an adsorption instruction of a first manipulation body in a manipulation body pair in a virtual space towards a space panel, an associated position of the first manipulation body.

The virtual space can be a corresponding virtual environment simulated by the XR device for a real interactive scene selected by any user, so as to display corresponding interactive information in the virtual space. For example, the user selects a certain type of livestream scene to construct a corresponding virtual livestream environment as the virtual space in this application, so that each viewer can enter the virtual space to realize corresponding livestream interaction. Usually, after wearing the XR device, the user will enter the virtual space provided by the fusion of a real scene and a virtual scene.

In the virtual space, in order to realize all kinds of interactions in the virtual space, the user is usually supported to perform corresponding interactive operations and controls on corresponding virtual objects. Therefore, a corresponding manipulation body will be presented in the virtual space, and the manipulation body is such configured that the user performs a corresponding interaction with each virtual object through the manipulation body according to a corresponding interactive operation and control instruction initiated on the manipulation body by the user.

Moreover, in order to adapt to the user's double-hand manipulation in the real scene, two manipulation bodied can be set in the virtual space to form a manipulation body pair in this application.

In some possible implementations, the manipulation body pair in this application can be one of the following:

1) A double-handle model consisting of a left-handle model and a right-handle model.

In terms of the XR device, the user can use real handles configured on the XR device to manipulate the interaction between the user and various virtual objects in the virtual space. In this case, in order to simulate the interactive operation performed by the user in the virtual space with the real handles, corresponding left-handle and right-handle models can be constructed in the virtual space. Then, by detecting the pose information of the real handles held by the user's hands, the left-handle model and the right-handle model are respectively controlled to perform corresponding movements in the virtual space. Moreover, according to the user's operations on the corresponding buttons and joysticks on the real handles, the left-handle model and the right-handle model are respectively controlled to perform corresponding interactive operations with various virtual objects in the virtual space.

It should be understood that the left-handle model and the right-handle model usually appear in pairs in the virtual space, and can form a corresponding double-handle model as a manipulation body pair in this application.

The left-handle model and the right-handle model can be presented separately in the virtual space, or can be presented in the form of a hand model holding a handle model, which is not limited in this application.

2) A double-hand model consisting of a left-hand model and a right-hand model.

In order to realize the realize the diversity of interaction in the virtual space, the interactive operations performed by user in the virtual space with real handles can also be realized through different actions of hand models in the virtual space. For example, a grab button is set on the real handle. After clicking the grab button on the real handle, the user can control the hand model corresponding to the real handle to perform a corresponding grab action. Therefore, in this application, the corresponding left-hand and right-hand models can also be constructed in the virtual space, which are in one-to-one correspondence with the real handles held by the user's left and right hands.

Then, by detecting the pose information of the real handles held by the user's hands, the left-hand model and the right-hand model are respectively controlled to perform corresponding movements in the virtual space. Moreover, according to the user's operations on the corresponding buttons and joysticks on the real handles, the left-hand model and the right-hand model are respectively controlled to perform corresponding interactive operations with various virtual objects in the virtual space.

Similarly, the left-hand model and the right-hand model usually appear in pairs in the virtual space, and can form a corresponding double-hand model as a manipulation body pair in this application.

On the other hand, the interaction of the double-hand model in the virtual space can also be realized by detecting the gestures of the user's real hands in the real scene, so that the left-hand and right-hand models correspond to the user's real left and right hands respectively, so as to control the left-hand and right-hand models to follow the real left and right hands to perform the same gestures.

3) A real double-hand projection consisting of a real left-hand projection and a real right-hand projection.

In order to simulate the gestures of the user's real hands in the real scene, this application can further collect a real-time image containing the user's real left and right hands, so as to analyze the gestures of the real left and right hands by extracting the hand features of the real left and right hands in the real-time image, and present the corresponding real left-hand projection and real right-hand projection in the virtual space.

The real left-hand projection and the real right-hand projection in the virtual space can follow the user's real left and right hands to present the same gestures.

Similarly, the real left-hand projection and the real right-hand projection usually appear in pairs in the virtual space, and can form a corresponding real double-hand projection as a manipulation body pair in this application.

In terms of the manipulation body pair in the virtual space, in order to ensure the accuracy of the interaction in the virtual space, any manipulation body in the manipulation body pair can be taken as the first manipulation body and the other manipulation body as the second manipulation body.

That is, the first manipulation body in this application can be any single-hand model of the double-hand model, any single-handle model of the double-handle model, or any real single-hand projection of the real double-hand projection, while the second manipulation body can be the other single-hand model of the double-hand model, the other single-handle model of the double-handle model, or the other real single-hand projection of the real double-hand projection.

When a certain space panel is evoked for the first time in the virtual space, the space panel is usually presented in front of the user's line of sight by default. However, the manipulation body pair in virtual space is usually below the user's line of sight, which rarely blocks the user's line of sight. Therefore, in order to avoid blocking the user's line of sight by the space panel, this application can select any manipulation body of the manipulation body pair in the virtual space as the first manipulation body. Then, by detecting the user's click operation on the grab button when holding the real handles, or detecting the grab gesture of the user's real hands, the first manipulation body is controlled to initiate a corresponding adsorption instruction towards the space panel presented in the virtual space. The space panel in this application can be a manipulation panel, a gift panel, a function screening panel, etc., which are presented in the virtual space in addition to the virtual scene picture.

Then, after receiving the adsorption instruction of the first manipulation body towards the space panel, it indicates that the first manipulation body needs to adsorb the space panel at present, so as to avoid blocking the user's line of sight. Then, for the accuracy of the adsorption of the first manipulation body to the space panel, an associated position of the first manipulation body will be firstly determined, and the associated position can be a short-distance position downward in any direction around the first manipulation body. Preferably, the associated position can be a short-distance position in a certain direction in which the first manipulation body faces the second manipulation body.

For example, in the case where the first manipulation body is a left-handle model and the second manipulation body is a right-handle model, the associated position is usually located on the right side of the first manipulation body. Then, the associated position of the first manipulation body can be a short-distance position on the right side of the first manipulation body.

S120: Adsorbing the space panel to the associated position of the first manipulation body.

Figure 2:
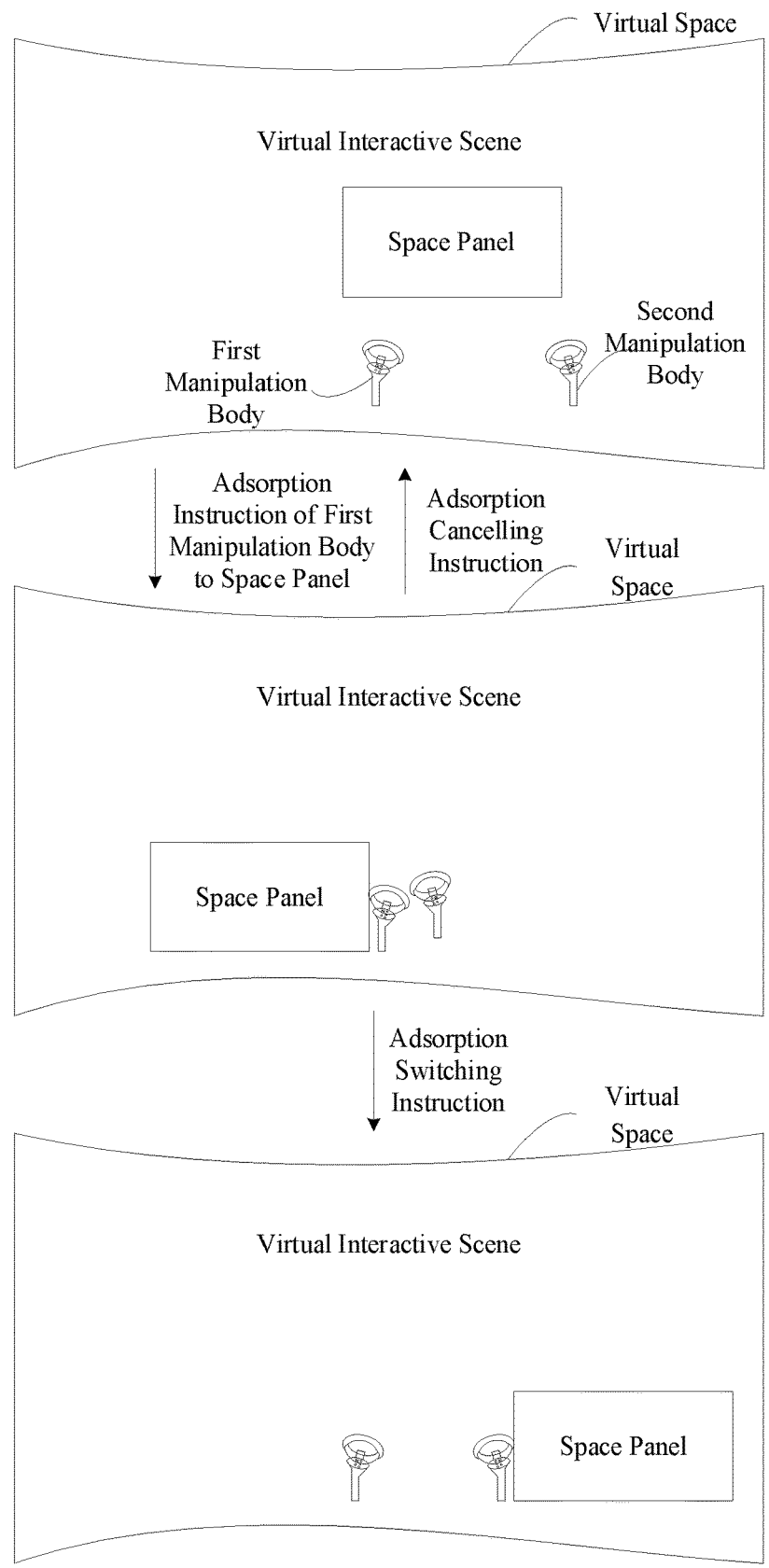
FIG. 2 is a schematic diagram of an adsorption process of a space panel in a virtual space provided by an embodiment of this application.

After determining the associated position of the first manipulation body, as shown in FIG. 2, the space panel is adsorbed to the associated position of the first manipulation body from the original position in front of the user's line of sight in the virtual space, so as to avoid blocking the user's line of sight.

In some possible implementations, after the space panel is adsorbed to the associated position of the first manipulation body, the space panel can be controlled to enter a following state of the first manipulation body, so that the space panel can follow the movement of the first manipulation body and perform the same movement, thus preventing the problem that the space panel continuously flutters in the virtual space due to frequent changes of the user's line of sight, and ensuring the presentation stability of the space panel in the virtual space.

Moreover, considering that the first manipulation body and the second manipulation body usually appear in pairs in the virtual space and are relatively close to each other, it is convenient for efficient interaction. Therefore, after the space panel is adsorbed to the associated position of the first manipulation body, the second manipulation body can be supported to perform corresponding interactive operations towards the space panel adsorbed by the first manipulation body. That is, the space panel adsorbed by the first manipulation body can be conveniently touched through the second manipulation body, and the corresponding interactive operations can be performed on the space panel, so that the convenience of interaction of the space panel is improved, and the fun and user atmosphere of panel interaction in the virtual space are enhanced. For example, any virtual object can be grabbed from the space panel and thrown into the virtual space, and so on.

In some other possible implementations, in order to maintain the adsorption of the first manipulation body to the space panel, the first manipulation body is usually inconvenient to perform other interactive operations, so when the space panel is adsorbed to the associated position of the first manipulation body, the first manipulation body will be controlled to change from a manipulable state to an non-manipulable state. That is, when the space panel is adsorbed by the first manipulation body, the first manipulation body is no longer supported to perform corresponding manipulating interaction on various virtual objects in the virtual space, so that the first manipulation body can exclusively maintain its adsorption state to the space panel to avoid adsorption failure.

Considering that when the user no longer needs to interact with the space panel in the virtual space, in order to avoid affecting the interactive operation of the first manipulation body, the user can usually manipulate a corresponding retract button on the real handle, or perform a corresponding panel retracting gesture through the real hand, so as to initiate a corresponding retraction instruction to the space panel absorbed by the first manipulation body. Further, in response to the retraction instruction of the space panel absorbed by the first manipulation body, the absorbed space panel is hidden at the associated position of the first manipulation body, and the first manipulation body is controlled to change from the non-manipulable state back to the manipulable state.

That is to say, after receiving the retraction instruction of the space panel absorbed by the first manipulation body, a preset hiding special effect can be used to hide the absorbed space panel directly at the associated position of the first manipulation body. For example, the absorbed space panel will be continuously shrunk until it disappears, and so on. Then, for the retracted space panel, the first manipulation body does not need to maintain the adsorption state of the space panel, so the first manipulation body can be controlled to change from the non-manipulable state back to the manipulable state, so as to support the first manipulation body to perform corresponding manipulating interaction on various virtual objects in the virtual space again.

When the user needs to interact with the space panel absorbed by the first manipulation body again, the user can manipulate a corresponding evoke button on the real handle or perform a corresponding panel evoking gesture through the real hand, so as to initiate a corresponding evocation instruction to the space panel absorbed by the first manipulation body. Further, in response to the evocation instruction of the space panel absorbed by the first manipulation body, the absorbed space panel is re-presented at the associated position of the first manipulation body, and the first manipulation body is controlled to change from the manipulable state to the non-manipulable state again.

That is to say, after receiving the evocation instruction of the space panel absorbed by the first manipulation body, a preset evoking special effect can be used to re-present the absorbed space panel at the associated position of the first manipulation body. For example, the absorbed space panel will be continuously enlarged from a minimized state until it is restored to the original panel size, and so on. Then, for the re-evoked space panel, the first manipulation body needs to maintain the adsorption state of the space panel again, so the first manipulation body can be controlled to change from the manipulable state to the non-manipulable state again, and the first manipulation body is no longer supported to perform corresponding manipulating interaction on various virtual objects in the virtual space.

In addition, considering that users have different habits of using the manipulation body pair when interacting with various virtual objects, after the space panel is adsorbed to the associated position of the first manipulation body, if the user is not used to using the second manipulation body to perform the corresponding interactive operations on the space panel, this application can control the second manipulation body to gradually approach the space panel adsorbed by the first manipulation body in the virtual space. Then, after the second manipulation body touches the space panel adsorbed by the first manipulation body, by detecting the user's triggering operation on the grab button on any real handle represented by the second manipulation body, or detecting the user's grabbing gesture of any real hand represented by the second manipulation body, an adsorption switching instruction of the second manipulation body to the space panel adsorbed by the first manipulation body can be generated.

Further, in response to the adsorption switching instruction, as shown in FIG. 2, the space panel can be switched and adsorbed to an associated position of the second manipulation body, that is, the space panel adsorbed by the first manipulation body is switched to be adsorbed to the second manipulation body, so that the space panel follows the movement of the second manipulation body and performs the same movement. Moreover, the first manipulation body is supported to perform corresponding interactive operations on the space panel that is switched and adsorbed by the second manipulation body, so as to ensure that the user can use a non-customary manipulation body to adsorb the space panel, and use a customary manipulation body to perform corresponding interactive operations on the space panel.

As an optional implementation in this application, after the space panel is adsorbed to the associated position of the first manipulation body, if convenient manipulating interaction with the space panel is no longer needed in the virtual space, the adsorption of the first manipulation body to the space panel can be cancelled. By detecting the user's triggering operation on a cancel grab button on any real handle represented by the first manipulation body, or detecting the user's grabbing and releasing gesture of any real hand represented by the first manipulation body, an adsorption cancelling instruction of the first manipulation body towards the adsorbed space panel can be generated. Then, in response to the adsorption cancelling instruction of the first manipulation body towards the space panel, the space panel can be folded back to the original position in the virtual space.

That is, after receiving the adsorption cancelling instruction of the first manipulation body towards the adsorbed space panel, as shown in FIG. 2, the space panel can be controlled to be folded back from the associated position of the first manipulation body to the original position where it was initially presented in the virtual space, thus releasing the adsorption of the first manipulation body to the space panel.

According to the technical solutions provided by the embodiments of this application, any manipulation body in the manipulation body pair in the virtual space is taken as the first manipulation body, and the other manipulation body is taken as the second manipulation body. Then, the first manipulation body initiates a corresponding adsorption instruction towards the space panel to adsorb the space panel to the associated position of the first manipulation body, so as to make the space panel move with the first manipulation body, thereby realizing the adsorption of any manipulation body in the virtual space to the space panel, ensuring the same following movement of the space panel under the first manipulation body, avoiding blocking the user's line of sight in the virtual space, preventing the problem that the space panel continuously flutters in the virtual space due to frequent changes of the user's line of sight, and ensuring the presentation stability of the space panel in the virtual space. Moreover, the second manipulation body is supported to perform corresponding interactive operations on the space panel adsorbed by the first manipulation body, so that the convenience of interaction of the space panel in the virtual space is improved, and the fun and user atmosphere of panel interaction in the virtual space are enhanced.

According to one or more embodiments of this application, there may be multiple space panels of different types in the virtual space, and the relative distance between the original position of each space panel where it was initially presented in the virtual space and the user position of the user in the virtual space is different. In this application, according to the relative distance between each space panel and the user, the space panels can be divided into near-field panels and far-field panels. A space panel whose relative distance from the user position of the user in the virtual space is less than or equal to the upper limit of the near-field distance (which can be set as 1m in this application) is taken as a near-field panel, and a space panel whose relative distance is greater than the upper limit of the near-field distance but less than or equal to the upper limit of the far-field distance (which can be set as 3 m in this application) is taken as a far-field panel.

Because the near-field panel and the far-field panel have different relative distances from the user, the near-field panel at a short distance can support the user to perform interactive operations directly acting on the near-field panel, while the far-field panel at a long distance may not support the user to conveniently perform interactive operations directly acting on the far-field panel by using any manipulation body in the manipulation body pair. Therefore, in order to ensure the convenient adsorption of the near-field panel and the far-field panel, for adsorption instructions of the first manipulation body towards the near-field panel and the far-field panel, this application can set different adsorption triggering operations to generate corresponding adsorption instructions.

Next, a specific generation process of the adsorption instruction of the first manipulation body towards the near-field panel is firstly illustrated.

Figure 3:
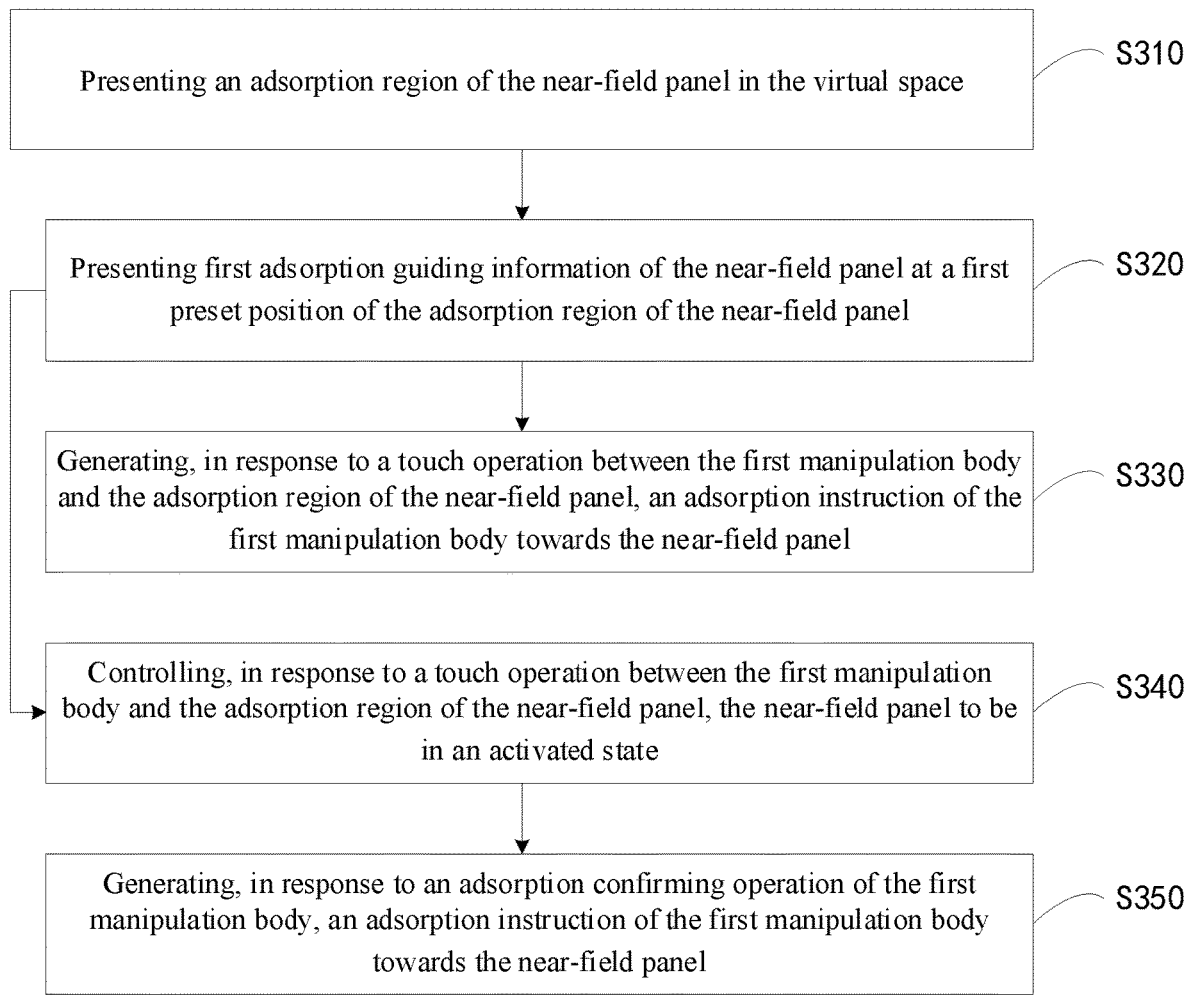
FIG. 3 is a method flowchart of a generation process of an adsorption instruction of a first manipulation body towards a near-field panel provided by an embodiment of this application.

FIG. 3 is a method flowchart of a generation process of an adsorption instruction of a first manipulation body towards a near-field panel provided by an embodiment of the application, and the method can include the following steps:

S310: Presenting an adsorption region of the near-field panel in the virtual space.

In order to enhance the interaction diversity of the first manipulation body adsorbing the near-field panel in the virtual space, considering that the relative distance between the near-field panel and the user is relatively short, interactive operations triggered directly are supported. Therefore, this application can set a corresponding adsorption region for the near-field panel, and the adsorption region is used to instruct the first manipulation body to initiate a corresponding adsorption instruction towards the near-field panel by colliding with the near-field panel.

Therefore, for the space panel presented in the virtual space, this application can simultaneously present a corresponding adsorption region at a corresponding position of the near-field panel when the near-field panel is initially presented in the virtual space. It is also possible to present the near-field panel in the virtual space first, and then present a corresponding adsorption region at a corresponding position of the near-field panel after receiving the user's adsorption request for the near-field panel.

In this application, the adsorption region of the near-field panel can be a block region of any shape set at any associated position of the near-field panel, which is not limited herein. Exemplarily, as shown in FIG. 4A and FIG. 4B, the adsorption region of the near-field panel can be one of the following regions:

1) A spherical region set at at least one vertex among vertices of the near-field panel.

Figure 4A:
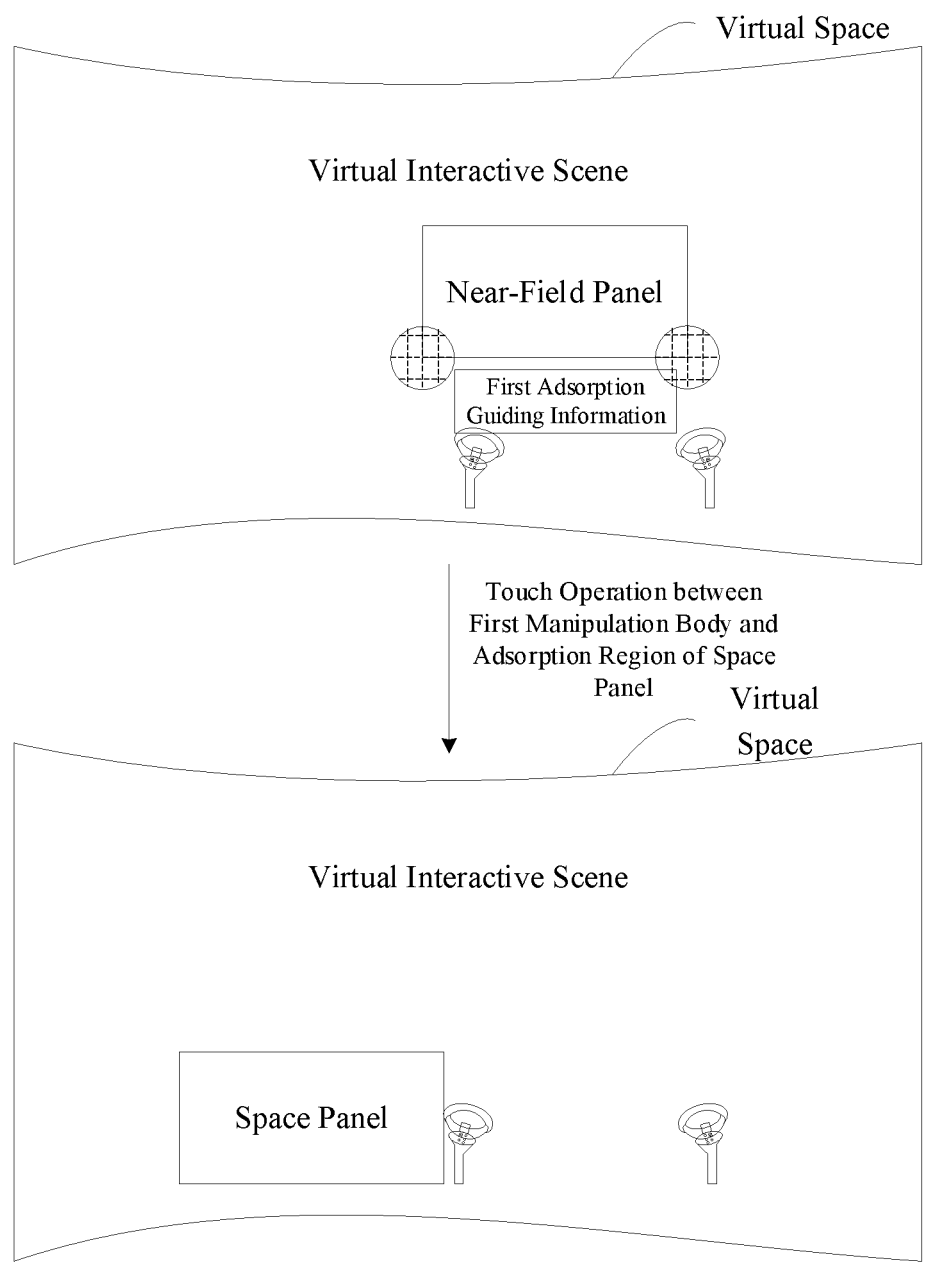
FIG. 4A and FIG. 4B are exemplary schematic diagrams of an adsorption region of a near-field panel provided by embodiments of this application, respectively.
Figure 4B:
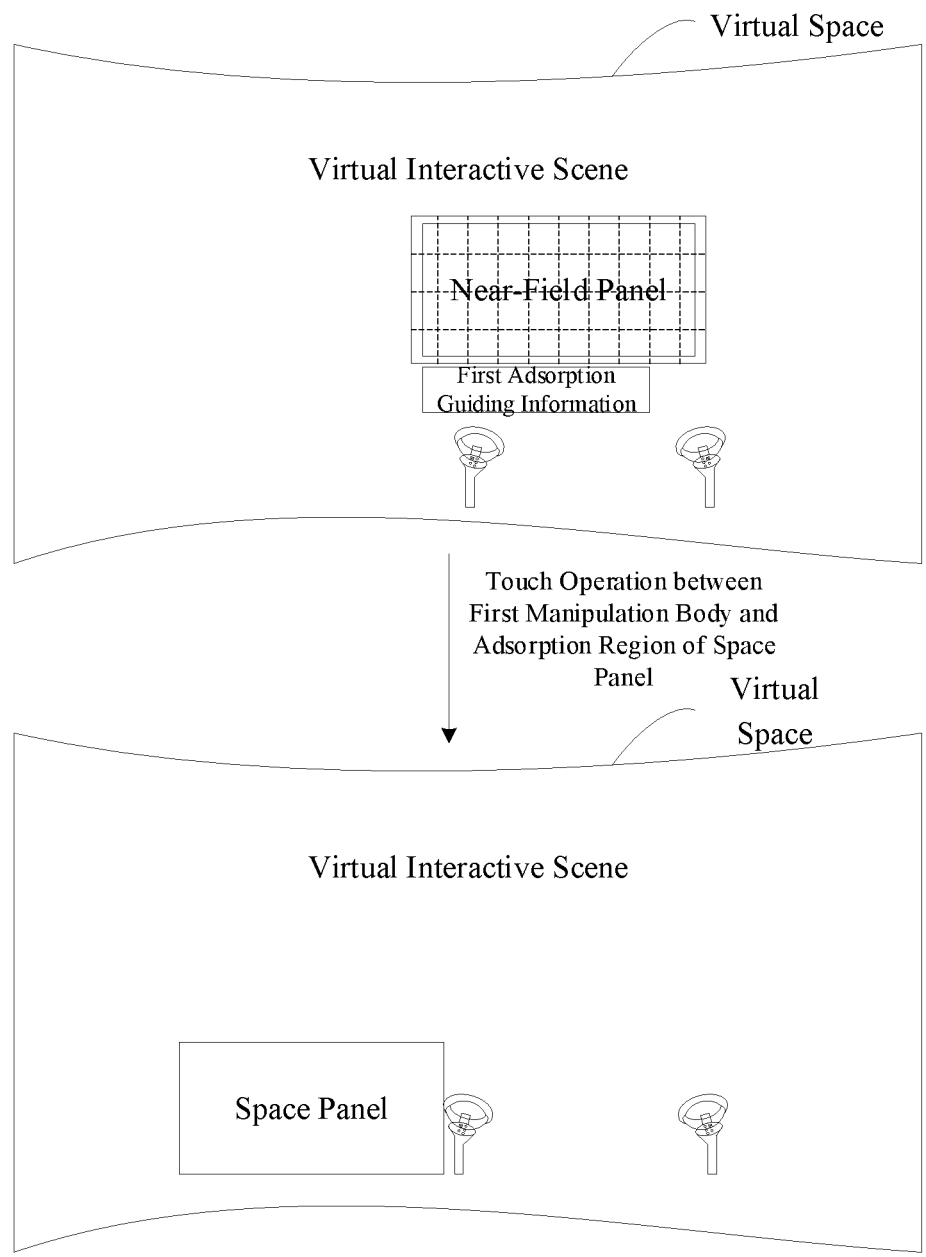

As shown in FIG. 4A, the near-field panel usually has multiple vertices. This application can set a corresponding spherical region at at least one vertex among the vertices of the near-field panel as an adsorption region of the near-field panel.

It should be understood that the number of adsorption regions of the near-field panel can be multiple, so that the first manipulation body can touch any adsorption region to complete the user's adsorption triggering operation towards the near-field panel.

2) A polygonal region covered on the near-field panel.

In order to ensure a quick adsorption triggering operation of the first manipulation body towards the near-field panel, this application can set a polygonal region capable of covering the near-field panel above the near-field panel, such as a quadrilateral region as shown in FIG. 4B, so that when the user controls the first manipulation body to touch any position of the near-field panel, the corresponding adsorption operation can be triggered.

S320: Presenting first adsorption guiding information of the near-field panel at a first preset position of the adsorption region of the near-field panel.

In order to ensure the accurate adsorption of the first manipulation body to the near-field panel, after the adsorption region of the near-field panel is presented in the virtual space, this application can determine the first preset position of the adsorption region of the near-field panel. Then, the first adsorption guiding information of the near-field panel is presented at the first preset position.

The first adsorption guiding information can include instruction information guiding the user to control any manipulation body to touch the adsorption region of the space panel to complete the adsorption of any manipulation body to the near-field panel.

S330: Generating, in response to a touch operation between the first manipulation body and the adsorption region of the near-field panel, an adsorption instruction of the first manipulation body towards the near-field panel.

In one case, when the user needs to adsorb the near-field panel in the virtual space through the first manipulation body, the user can control the first manipulation body to touch any adsorption region of the near-field panel in the virtual space according to the first adsorption guiding information of the near-field panel. Then, after detecting the touch between the first manipulation body and the adsorption region of the near-field panel, an adsorption instruction of the first manipulation body towards the near-field panel is directly generated in response to the touch operation, so as to adsorb the near-field panel corresponding to the adsorption region touched by the first manipulation body to the associated position of the first manipulation body, so that the near-field panel can follow the movement of the first manipulation body and perform the same movement.

It should be noted that in order to achieve accurate touch between the first manipulation body and the adsorption region of the near-field panel, this application can further set a corresponding collision region for the first manipulation body, which is used for the touch on the adsorption region of the near-field panel. When the collision region of the first manipulation body touches the adsorption region of the near-field panel, the touch operation between the first manipulation body and the adsorption region of the near-field panel can be detected.

S340: Controlling, in response to a touch operation between the first manipulation body and the adsorption region of the near-field panel, the near-field panel to be in an activated state.

In another case, in order to avoid the accidental adsorption of the near-field panel caused by the accidental touch between the first manipulation body and the adsorption region of the near-field panel, after detecting the touch operation between the first manipulation body and the adsorption region of the near-field panel, this application does not immediately generate an adsorption instruction of the first manipulation body towards the near-field panel, but firstly controls the near-field panel to be in an activated state, so as to prompt the user that it is necessary to further manipulate a corresponding confirm button on the real handle or perform a corresponding adsorption confirming gesture through the real hand, such as a dragging gesture, etc., to control the first manipulation body to confirm whether it is needed to adsorb the near-field panel at present, thus avoiding the accidental adsorption of the near-field panel by the first manipulation body.

S350: Generating, in response to an adsorption confirming operation of the first manipulation body, an adsorption instruction of the first manipulation body towards the near-field panel.

After detecting the adsorption confirming operation of the first manipulation body, it indicates that the first manipulation body currently determines that the near-field panel needs to be adsorbed, so an adsorption instruction of the first manipulation body towards the near-field panel can be generated, so that the near-field panel corresponding to the adsorption region touched by the first manipulation body can be adsorbed to the associated position of the first manipulation body, and the near-field panel can follow the movement of the first manipulation body and perform the same movement.

However, if an adsorption denying operation of the first manipulation body is detected, it indicates that the first manipulation body does not need to adsorb the near-field panel at present, so the adsorption instruction of the first manipulation body towards the near-field panel will not be generated, thus avoiding the accidental adsorption of the near-field panel by the first manipulation body.

It should be noted that in this application, S330 and S340-S350 are both operations for generating the adsorption instruction of the first manipulation body towards the near-field panel, so S330 and S340-S350 will not be executed in full, but a generation method of the adsorption instruction will be selected.

Next, a specific generation process of the adsorption instruction of the first manipulation body towards the far-field panel is illustrated.

Figure 5:
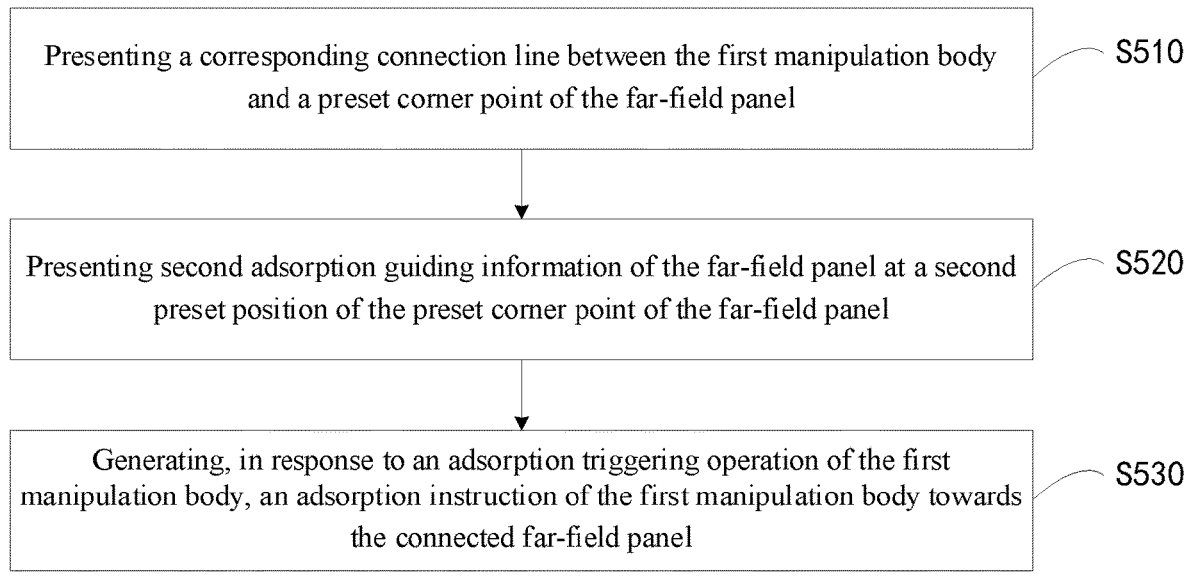
FIG. 5 is a method flowchart of a generation process of an adsorption instruction of a first manipulation body towards a far-field panel provided by an embodiment of this application.

FIG. 5 is a method flowchart of a generation process of an adsorption instruction of a first manipulation body towards a far-field panel provided by an embodiment of this application, and the method can include the following steps:

S510: Presenting a corresponding connection line between the first manipulation body and a preset corner point of the far-field panel.

Considering that the relative distance between the far-field panel and the user position of the user in the virtual space is relatively long, it is not convenient for the user to control the first manipulation body to directly touch the far-field panel. Therefore, in order to ensure a quick adsorption triggering operation of the first manipulation body towards the far-field panel, this application will set a corner point on the far-field panel as a preset corner point in this application, which is used to represent a position point with an outstanding attribute on the far-field panel.

In this application, after the far-field panel is presented in the virtual space, the preset corner point on the far-field panel can be firstly determined. Then, a corresponding connection line is presented between the first manipulation body and the preset corner point of the far-field panel to connect the first manipulation body with the far-field panel, so as to subsequently control the first manipulation body to adsorb the connected far-field panel.

In some possible implementations, because there may be a plurality of far-field panels presented in the virtual space, in order to ensure the unified adsorption of the far-field panels, this application will determine a total corner point of the integration of the plurality of far-field panels and present a corresponding connection line between the first manipulation body and the total corner point.

That is to say, for the multiple far-field panels presented in the virtual space, this application will integrate the multiple far-field panels and then set a unified total corner point. Furthermore, a corresponding connection line is presented between the first manipulation body and the total corner point to uniformly connect the first manipulation body with the multiple far-field panels, so as to subsequently control the first manipulation body to uniformly adsorb the connected multiple far-field panels.

In some other possible implementations, the virtual environment region that the user can perceive in the virtual space is taken as the virtual field of view in the virtual space. Because the virtual field of view that the user can perceive in the virtual space is limited, the first manipulation body may or may not be within the virtual field of view. Then, the connection line between the first manipulation body and the preset corner point of the far-field panel will have different situations.

If the first manipulation body is within the virtual field of view in the virtual space, a corresponding connection line can be directly presented between the first manipulation body and the preset corner point of the far-field panel. However, if the first manipulation body is not within the virtual field of view in the virtual space, a corresponding connection line is presented between the preset corner point of the far-field panel and a preset edge point of the virtual field of view; after the first manipulation body enters the virtual field of view, the first manipulation body replaces the preset edge point, so as to present the connection line between the first manipulation body and the preset corner point of the far-field panel.

Figure 6:
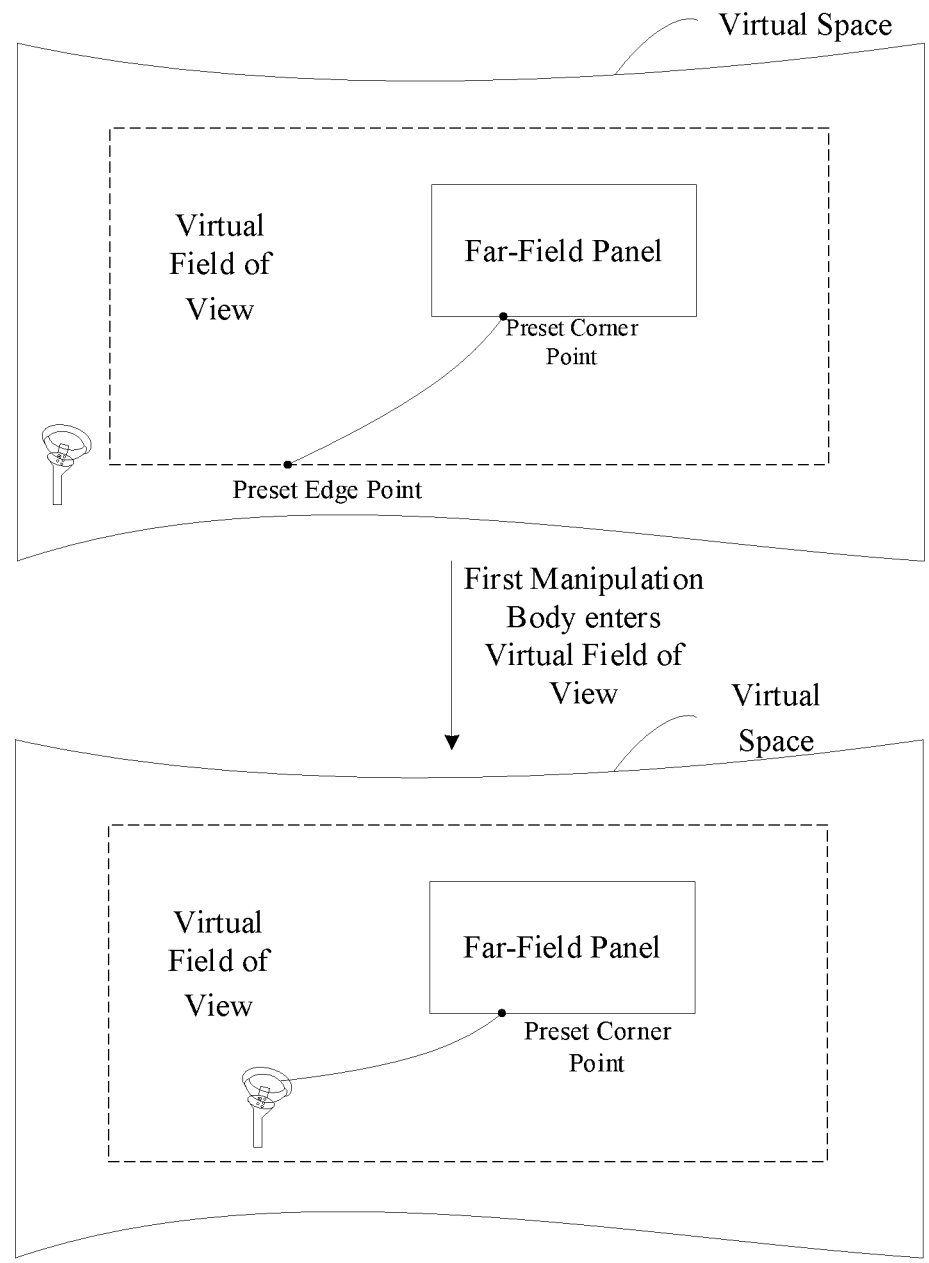
FIG. 6 is an exemplary schematic diagram of a connection line presented between a first manipulation body and a far-field panel provided by an embodiment of this application.

That is to say, when the first manipulation body is not within the virtual field of view in the virtual space, the user cannot perceive the first manipulation body in the virtual space. Therefore, in order to represent the connection between the far-field panel and the first manipulation body, this application can set an edge point on the boundary of the virtual field of view as the preset edge point in this application. Then, as shown in FIG. 6, a corresponding connection line is presented between the preset corner point of the far-field panel and the preset edge point to represent the connection between the far-field panel and the first manipulation body.

Then, after the first manipulation body enters the virtual field of view, the user can perceive the first manipulation body in the virtual space. Therefore, as shown in FIG. 6, the first manipulation body can directly replace the preset edge point of the virtual field of view, so that a corresponding connection line is presented between the first manipulation body and the preset corner point of the far-field panel to connect the first manipulation body with the far-field panel.

S520: Presenting second adsorption guiding information of the far-field panel at a second preset position of the preset corner point of the far-field panel.

In order to ensure the accurate adsorption of the first manipulation body to the far-field panel, after the corresponding connection line is presented between the first manipulation body and the preset corner point of the far-field panel, this application can determine the second preset position of the preset corner point of the far-field panel. Then, the second adsorption guiding information of the far-field panel is presented at the second preset position.

The second adsorption guiding information can include instruction information guiding the user to control any manipulation body to perform a corresponding adsorption triggering operation on the connected far-field panel to complete the adsorption of any manipulation body to the far-field panel.

S530: Generating, in response to an adsorption triggering operation of the first manipulation body, an adsorption instruction of the first manipulation body towards the connected far-field panel.

The user manipulates a corresponding confirm button on the real handle or performs a corresponding adsorption confirming gesture through the real hand, to control the first manipulation body to perform a corresponding adsorption triggering operation on the connected far-field panel. Then, in response to the adsorption triggering operation, an adsorption instruction of the first manipulation body towards the connected far-field panel can be generated, so that the far-field panel connected with the first manipulation body can be adsorbed to the associated position of the first manipulation body, and the far-field panel can follow the movement of the first manipulation body and perform the same movement.

According to the technical solutions provided by the embodiment of this application, different adsorption operations are respectively set for the near-field panel and the far-field panel in the virtual space, so that different adsorption interactions of any manipulation body in the virtual space towards the near-field panel and the far-field panel are realized, the convenience of interaction of the space panel in the virtual space is improved, and the fun and user atmosphere of panel interaction in the virtual space are enhanced.

Figure 7:
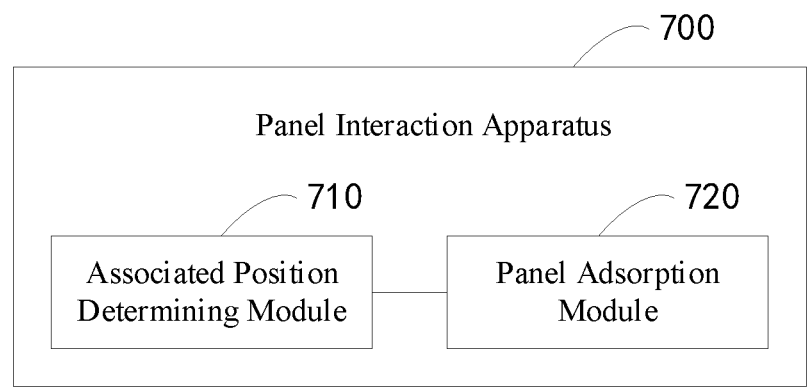
FIG. 7 is a schematic diagram of a panel interaction apparatus provided by an embodiment of this application.

FIG. 7 is a schematic diagram of a panel interaction apparatus provided by an embodiment of this application. The panel interaction apparatus 700 can be configured on an XR device, and the panel interaction apparatus 700 includes:

an associated position determining module 710, configured to determine, in response to an adsorption instruction of a first manipulation body in a manipulation body pair in a virtual space towards a space panel, an associated position of the first manipulation body;

a panel adsorption module 720, configured to adsorb the space panel to the associated position of the first manipulation body, so as to make the space panel move with the first manipulation body, and support a second manipulation body in the manipulation body pair to perform a corresponding interactive operation towards the space panel.

In some possible implementations, the manipulation body pair includes one of the following:

1) a double-handle model consisting of a left-handle model and a right-handle model;

2) a double-hand model consisting of a left-hand model and a right-hand model;

3) a real double-hand projection consisting of a real left-hand projection and a real right-hand projection;

wherein the first manipulation body is any single-hand model of the double-hand model, any single-handle model of the double-handle model, or any real single-hand projection of the real double-hand projection, and the second manipulation body is the other single-hand model of the double-hand model, the other single-handle model of the double-handle model, or the other real single-hand projection of the real double-hand projection.

In some possible implementations, the panel interaction apparatus 700 can further include:

an adsorption switching module, configured to switch and adsorb, in response to an adsorption switching instruction of the second manipulation body towards the space panel adsorbed by the first manipulation body, the space panel to an associated position of the second manipulation body, so as to support the first manipulation body to perform a corresponding interactive operation towards the space panel.

In some possible implementations, the panel interaction device 700 can further include:

an adsorption cancelling module, configured to fold, in response to an adsorption cancelling instruction of the first manipulation body towards the space panel, the space panel back to an original position in the virtual space.

In some possible implementations, the space panel includes a near-field panel and a far-field panel.

In some possible implementations, in the case where the space panel is the near-field panel, the panel interaction apparatus 700 can further include a near-field adsorption instruction generating module. The near-field adsorption instruction generating module is configured to:

present an adsorption region of the near-field panel in the virtual space;

generate, in response to a touch operation between the first manipulation body and the adsorption region of the near-field panel, an adsorption instruction of the first manipulation body towards the near-field panel; or, control, in response to a touch operation between the first manipulation body and the adsorption region of the near-field panel, the near-field panel to be in an activated state; and generate, in response to an adsorption confirming operation of the first manipulation body, an adsorption instruction of the first manipulation body towards the near-field panel.

In some possible implementations, the panel interaction apparatus 700 can further include:

a near-field adsorption guiding module, configured to present first adsorption guiding information of the near-field panel at a first preset position of the adsorption region of the near-field panel.

In some possible implementations, the adsorption region of the near-field panel is one of the following regions:

a spherical region set at at least one vertex among vertices of the near-field panel;

a polygonal region covered on the near-field panel.

In some possible implementations, in the case where the space panel is the far-field panel, the panel interaction apparatus 700 can further include a far-field adsorption instruction generating module. The far-field adsorption instruction generating module can be configured to:

present a corresponding connection line between the first manipulation body and a preset corner point of the far-field panel;

generate, in response to an adsorption triggering operation of the first manipulation body, an adsorption instruction of the first manipulation body towards the connected far-field panel.

In some possible implementations, if there are a plurality of far-field panels evoked in the virtual space, the far-field adsorption instruction generating module can be specifically configured to:

determine a total corner point of an integration of the plurality of far-field panels;

present a corresponding connection line between the first manipulation body and the total corner point.

In some possible implementations, the panel interaction apparatus 700 can further include:

a far-field adsorption guiding module, configured to present second adsorption guiding information of the far-field panel at a second preset position of the preset corner point of the far-field panel.

In some possible implementations, the far-field adsorption instruction generating module can further be specifically configured to:

present, if the first manipulation body is not in a virtual field of view in the virtual space, a corresponding connection line between the preset corner point of the far-field panel and a preset edge point of the virtual field of view;

replace, after the first manipulation body enters the virtual field of view, the preset edge point with the first manipulation body, so as to present the connection line between the first manipulation body and the preset corner point of the far-field panel.

In some possible implementations, the panel interaction apparatus 700 can further include:

a state changing module, configured to control the first manipulation body to change from a manipulable state to a non-manipulable state.

In some possible implementations, the panel interaction apparatus 700 can further include:

a panel hiding module, configured to hide, in response to a retraction instruction of the space panel absorbed by the first manipulation body, the absorbed space panel at the associated position of the first manipulation body, and control the first manipulation body to change from the non-manipulable state back to the manipulable state;

a panel evoking module, configured to re-present, in response to an evocation instruction of the space panel absorbed by the first manipulation body, the absorbed space panel at the associated position of the first manipulation body, and control the first manipulation body to change from the manipulable state to the non-manipulable state again.

In the embodiments of this application, any manipulation body in the manipulation body pair in the virtual space is taken as the first manipulation body, and the other manipulation body is taken as the second manipulation body. Then, the first manipulation body initiates a corresponding adsorption instruction towards the space panel to adsorb the space panel to the associated position of the first manipulation body, so as to make the space panel move with the first manipulation body, thereby realizing the adsorption of any manipulation body in the virtual space to the space panel, ensuring the same following movement of the space panel under the first manipulation body, avoiding blocking the user's line of sight in the virtual space, preventing the problem that the space panel continuously flutters in the virtual space due to frequent changes of the user's line of sight, and ensuring the presentation stability of the space panel in the virtual space. Moreover, the second manipulation body is supported to perform corresponding interactive operations on the space panel adsorbed by the first manipulation body, so that the convenience of interaction of the space panel in the virtual space is improved, and the fun and user atmosphere of panel interaction in the virtual space are enhanced.

It should be understood that the apparatus embodiments and the method embodiments in this application can correspond to each other, and similar descriptions can refer to the method embodiments in this application. In order to avoid repetition, details are not repeated here.

Specifically, the apparatus 700 shown in FIG. 7 can implement any method embodiment provided by this application, and the aforementioned and other operations and/or functions of each module in the apparatus 700 shown in FIG. 7 are respectively for implementing the corresponding flow of the above method embodiments. The details are not repeated herein for brevity.

The foregoing method embodiment among the embodiments of this application is described above from the perspective of functional modules with reference to the accompanying drawings. It is to be understood that the functional modules may be implemented in a hardware form, may be implemented by using instructions in a software form, and may alternatively be implemented by a combination of hardware and a software module. Specifically, each step of the method embodiment among the embodiments of this application can be completed through an integrated logic circuit of hardware in the processor and/or instructions in a software form, and the steps of the method disclosed in combination with the embodiments of this application can be performed and completed by a hardware decoding processor or hardware in the hardware decoding processor combined with a software module. Optionally, the software module can be located in a mature storage medium in this field, such as a random access memory, a flash memory, a read-only memory, a programmable read-only memory, an electrically erasable programmable memory, or a register, etc. The storage medium is located in the memory, and a processor reads information in the memory, and completes the steps in the foregoing method embodiments with the hardware thereof.

Figure 8:
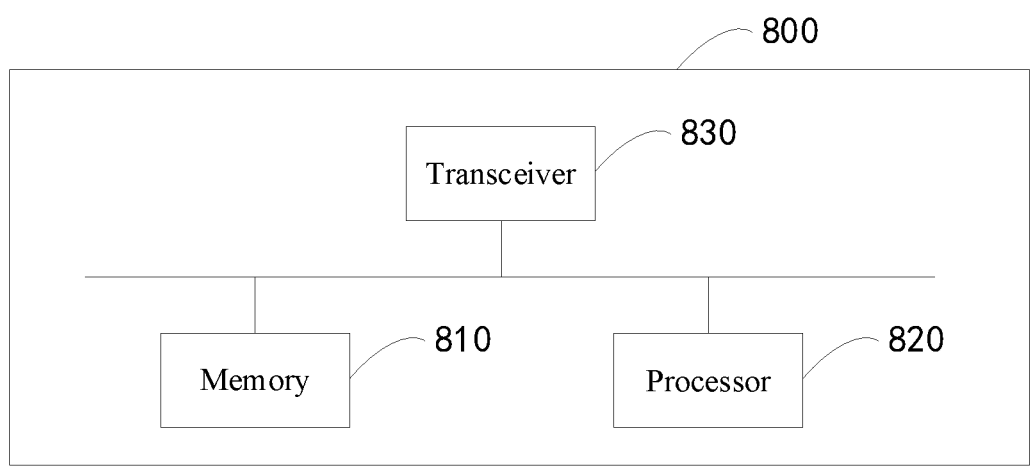
FIG. 8 is a schematic block diagram of an electronic device provided by an embodiment of this application.

FIG. 8 is a schematic block diagram of an electronic device provided by an embodiment of the present application.

As shown in FIG. 8, the electronic device 800 can include:

a memory 810 and a processor 820, wherein the memory 810 is configured to store a computer program and transmit program code to the processor 820. In other words, the processor 820 can call and run the computer program stored in the memory 810 to implement the method in the embodiments of this application.

For example, the processor 820 can be configured to implement the method embodiments according to instructions in the computer program.

In some embodiments of this application, the processor 820 can include, but is not limited to:

a general purpose processor, a digital signal processor (DSP), an application specific integrated circuit (ASIC), a field programmable gate array (FPGA) or any other programmable logic device, a discrete gate or a transistor logic device, a discrete hardware component, and so on.

In some embodiments of this application, the memory 810 includes, but is not limited to:

a volatile memory and/or a non-volatile memory. The non-volatile memory can be a read-only memory (ROM), a programmable read-only memory (PROM), an erasable programmable read-only memory (EPROM), an electrically erasable programmable read-only memory (EEPROM), or a flash memory. The volatile memory can be a random access memory (RAM), which is used as an external high-speed cache. Through illustrative but not restrictive description, RAMs in a plurality forms are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synch link dynamic random access memory (SLDRAM), and a direct rambus random access memory (DR RAM).

In some embodiments of this application, the computer program can be divided into one or more modules. The one or more modules are stored in the memory 810, and executed by the processor 820 to complete the method provided by this application. The one or more modules can be a series of computer program instruction segments that can accomplish specific functions, and the instruction segments are used to describe the execution process of the computer program in the electronic device 800.

As shown in FIG. 8, the electronic device can further include:

a transceiver 830, wherein the transceiver 830 can be connected to the processor 820 or the memory 810.

The processor 820 can control the transceiver 830 to communicate with other devices, and specifically, can send information or data to other devices, or receive information or data transmitted by other devices. The transceiver 830 can include a transmitter and a receiver. The transceiver 830 can further include an antenna, and the number of antennas can be one or more.

It should be understood that the components in the electronic device 800 are connected through a bus system, wherein the bus system includes a power bus, a control bus and a status signal bus in addition to a data bus.

This application further provides a computer storage medium, on which a computer program is stored. When the computer program is executed by a computer, the computer is enabled to perform the method according to the method embodiments.

An embodiment of this application further provides a computer program product including instructions. When the instructions are executed by a computer, the computer is caused to execute the method according to the method embodiments.

When implemented by software, implementation can be made in the form of a computer program product completely or in part. The computer program product includes one or more computer instructions. The one or more computer program instructions, when loaded and executed on a computer, produce all or a part of the processes or functions according to the embodiments of this application. The computer can be a general purpose computer, a special purpose computer, a computer network, or any other programmable device. The computer instructions can be stored in a computer-readable storage medium or transmitted from one computer-readable storage medium to another computer-readable storage medium. For example, the one or more computer instructions can be transmitted from one website, computer, server, or data center to another website, computer, server, or data center in a wired manner (e.g., coaxial cable, optical fiber, digital subscriber line (DSL)) or a wireless manner (e.g., infrared, wireless, microwave, etc.). The computer-readable storage medium can be any usable medium that can be accessed by a computer, or a data storage device integrated with one or more usable mediums, such as a server or a data center, etc. The usable medium can be a magnetic medium (e.g., a floppy disk, a hard disk, a magnetic tape), an optical medium (e.g., a digital video disc (DVD)), or a semiconductor medium (e.g., a solid state disk (SSD)), etc.

What has been described above is only the specific implementations of this application, but the protection scope of this application is not limited thereto. Any modification or replacement easily occurred to those skilled in the art within the technical scope disclosed in this application should fall into the protection scope of this application. Therefore, the protection scope of this application should be based on the protection scope of the claims.

The invention claimed is:

1. A panel interaction method, wherein the method is applied to an extended reality (XR) device, and the method comprises:
constructing a first manipulation body in a virtual space, wherein the first manipulation body corresponds to a real object associated with the XR device;
initiating an adsorption instruction by the first manipulation body towards a space panel in the virtual space in response to detecting an operation performed via the real object;
determining an associated position of the first manipulation body;
adsorbing the space panel to the associated position of the first manipulation body; and
controlling the first manipulation body to change from a manipulable state to a non-manipulable state in response to determining that the space panel is adsorbed by the first manipulation body, wherein the non-manipulable state is configured to maintain the first manipulation body in a state of absorbing the space panel and to prevent the first manipulation body from performing another manipulating interaction in the virtual space.

2. The method according to claim 1, wherein the space panel moves with the first manipulation body after being adsorbed to the associated position of the first manipulation body, the first manipulation body is a manipulation body in a manipulation body pair, and a second manipulation body in the manipulation body pair is supported to perform a corresponding interactive operation towards the space panel.

3. The method according to claim 2, wherein the manipulation body pair comprises one of the following:
1) A double-handle model consisting of a left-handle model and a right-handle model;
2) A double-hand model consisting of a left-hand model and a right-hand model;
3) A real double-hand projection consisting of a real left-hand projection and a real right-hand projection;
wherein the first manipulation body is any single-hand model of the double-hand model, any single-handle model of the double-handle model, or any real single-hand projection of the real double-hand projection, and the second manipulation body in the manipulation body pair is the other single-hand model of the double-hand model, the other single-handle model of the double-handle model, or the other real single-hand projection of the real double-hand projection.

4. The method according to claim 2, wherein after the space panel is adsorbed to the associated position of the first manipulation body, the method further comprises:
switching and adsorbing, in response to an adsorption switching instruction of the second manipulation body in the manipulation body pair towards the space panel adsorbed by the first manipulation body, the space panel to an associated position of the second manipulation body, so as to support the first manipulation body to perform a corresponding interactive operation towards the space panel.

5. The method according to claim 1, wherein after the space panel is adsorbed to the associated position of the first manipulation body, the method further comprises:
folding, in response to an adsorption cancelling instruction of the first manipulation body towards the space panel, the space panel back to an original position in the virtual space.

6. The method according to claim 1, wherein the space panel comprises a near-field panel and a far-field panel.

7. The method according to claim 6, wherein in a case where the space panel is the near-field panel, the method further comprises:
presenting an adsorption region of the near-field panel in the virtual space;
generating, in response to a touch operation between the first manipulation body and the adsorption region of the near-field panel, an adsorption instruction of the first manipulation body towards the near-field panel.

8. The method according to claim 6, wherein in a case where the space panel is the near-field panel, the method further comprises:
presenting an adsorption region of the near-field panel in the virtual space;
controlling, in response to a touch operation between the first manipulation body and the adsorption region of the near-field panel, the near-field panel to be in an activated state; and
generating, in response to an adsorption confirming operation of the first manipulation body, an adsorption instruction of the first manipulation body towards the near-field panel.

9. The method according to claim 7, wherein the method further comprises:
presenting first adsorption guiding information of the near-field panel at a first preset position of the adsorption region of the near-field panel.

10. The method according to claim 7, wherein the adsorption region of the near-field panel is one of the following regions:
a spherical region set at at least one vertex among vertices of the near-field panel; and
a polygonal region covered on the near-field panel.

11. The method according to claim 8, wherein the method further comprises:
presenting first adsorption guiding information of the near-field panel at a first preset position of the adsorption region of the near-field panel.

12. The method according to claim 8, wherein the adsorption region of the near-field panel is one of the following regions:
a spherical region set at at least one vertex among vertices of the near-field panel; and
a polygonal region covered on the near-field panel.

13. The method according to claim 6, wherein in a case where the space panel is the far-field panel, the method further comprises:
presenting a corresponding connection line between the first manipulation body and a preset corner point of the far-field panel; and
generating, in response to an adsorption triggering operation of the first manipulation body, an adsorption instruction of the first manipulation body towards the far-field panel which is connected.

14. The method according to claim 13, wherein if there are a plurality of far-field panels evoked in the virtual space, the presenting the corresponding connection line between the first manipulation body and the preset corner point of the far-field panel comprises:
determining a total corner point of an integration of the plurality of far-field panels;
presenting a corresponding connection line between the first manipulation body and the total corner point.

15. The method according to claim 13, wherein the method further comprises:
presenting second adsorption guiding information of the far-field panel at a second preset position of the preset corner point of the far-field panel.

16. The method according to claim 13, wherein the presenting the corresponding connection line between the first manipulation body and the preset corner point of the far-field panel comprises:
presenting, if the first manipulation body is not in a virtual field of view in the virtual space, a corresponding connection line between the preset corner point of the far-field panel and a preset edge point of the virtual field of view;
replacing, after the first manipulation body enters the virtual field of view, the preset edge point with the first manipulation body, so as to present the connection line between the first manipulation body and the preset corner point of the far-field panel.

17. The method according to claim 1, wherein after the space panel is adsorbed to the associated position of the first manipulation body, the method further comprises:
hiding, in response to a retraction instruction of the space panel absorbed by the first manipulation body, the absorbed space panel at the associated position of the first manipulation body, and controlling the first manipulation body to change from the non-manipulable state back to the manipulable state; and
re-presenting, in response to an evocation instruction of the space panel absorbed by the first manipulation body, the absorbed space panel at the associated position of the first manipulation body, and controlling the first manipulation body to change from the manipulable state to the non-manipulable state again.

18. An electronic device, comprising:
a processor; and
a memory, configured to store executable instructions of the processor;
wherein the processor is configured, by executing the executable instructions, to perform operations comprising:
constructing a first manipulation body in a virtual space, wherein the first manipulation body corresponds to a real object associated with the XR device;
initiating an adsorption instruction by the first manipulation body towards a space panel in the virtual space in response to detecting an operation performed via the real object;
determining an associated position of the first manipulation body;
adsorbing the space panel to the associated position of the first manipulation body; and
controlling the first manipulation body to change from a manipulable state to a non-manipulable state in response to determining that the space panel is adsorbed by the first manipulation body, wherein the non-manipulable state is configured to maintain the first manipulation body in a state of absorbing the space panel and to prevent the first manipulation body from performing another manipulating interaction in the virtual space.

19. A non-transitory computer-readable storage medium, on which a computer program is stored, wherein the computer program, when executed by a processor, causes the processor to perform operations comprising:
   constructing a first manipulation body in a virtual space, wherein the first manipulation body corresponds to a real object associated with the XR device;
   initiating an adsorption instruction by the first manipulation body towards a space panel in the virtual space in response to detecting an operation performed via the real object;
   determining an associated position of the first manipulation body;
   adsorbing the space panel to the associated position of the first manipulation body; and
   controlling the first manipulation body to change from a manipulable state to a non-manipulable state in response to determining that the space panel is adsorbed by the first manipulation body, wherein the non-manipulable state is configured to maintain the first manipulation body in a state of absorbing the space panel and to prevent the first manipulation body from performing another manipulating interaction in the virtual space.

* * * * *